US008839102B2

(12) United States Patent
Li et al.

(10) Patent No.: US 8,839,102 B2
(45) Date of Patent: Sep. 16, 2014

(54) METHOD TO AUTOMATICALLY DISPLAY FILENAMES ENCODED IN MULTIPLE CODE SETS

(75) Inventors: Li Li, Cedar Park, TX (US); Su Liu, Round Rock, TX (US); Azubuike Victor Onwuta, Austin, TX (US); Aruna Yedavilli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 531 days.

(21) Appl. No.: 12/956,941

(22) Filed: Nov. 30, 2010

(65) Prior Publication Data
US 2012/0137218 A1    May 31, 2012

(51) Int. Cl.
*G06F 17/20*     (2006.01)
*G06F 17/22*     (2006.01)

(52) U.S. Cl.
CPC .................................. *G06F 17/2217* (2013.01)
USPC ........................................... 715/256; 715/230

(58) Field of Classification Search
CPC ............................... H03M 7/705; G06F 17/20
USPC .................................................. 715/256, 230
See application file for complete search history.

(56) References Cited

U.S. PATENT DOCUMENTS

| | | | |
|---|---|---|---|
| 5,778,213 A * | 7/1998 | Shakib et al. ................... | 703/27 |
| 5,864,870 A | 1/1999 | Guck | |
| 6,085,199 A | 7/2000 | Rose | |
| 6,144,969 A * | 11/2000 | Inokuchi et al. ............... | 707/705 |
| 6,204,782 B1 * | 3/2001 | Gonzalez et al. ............... | 341/90 |
| 6,434,574 B1 * | 8/2002 | Day et al. ............................... | 1/1 |
| 7,010,551 B2 * | 3/2006 | Terayama et al. ...................... | 1/1 |
| 7,013,314 B2 | 3/2006 | Day et al. | |
| 7,278,100 B1 * | 10/2007 | Ehrman ......................... | 715/264 |
| 7,516,145 B2 * | 4/2009 | Sikchi et al. ............................ | 1/1 |
| 7,593,938 B2 * | 9/2009 | Lemar et al. ........................... | 1/1 |
| 7,801,906 B2 * | 9/2010 | Day et al. ...................... | 707/758 |
| 7,865,493 B2 * | 1/2011 | Kim et al. ..................... | 707/706 |
| 7,991,781 B2 * | 8/2011 | Day et al. ...................... | 707/756 |

(Continued)

OTHER PUBLICATIONS

Sun Microsystems, Inc.; File Systems, Unicode, and Normailization; 29th Internationalization & Unicode Conference; Mar. 2006.

(Continued)

*Primary Examiner* — Cesar Paula
*Assistant Examiner* — Mohammed-Ibrahim Zuberi
(74) *Attorney, Agent, or Firm* — Arthur Samodovitz; Robert C. Rolnik (57) ABSTRACT

A computer implemented method, computer program product, and computer system for viewing content encoded in at least one code set and stored in a file system. A computer identifies a unified code set covering all characters used in the file system. The computer, responsive to a user input to view the content, determines whether the content is wholly encoded in the unified code set. The computer, responsive to determining that the code set is not wholly encoded in the unified code set, converts encoding of the content to the unified code set to form converted content. The computer displays the converted content.

22 Claims, 5 Drawing Sheets

(56) References Cited

U.S. PATENT DOCUMENTS

| | | | |
|---|---|---|---|
| 8,141,074 B2* | 3/2012 | Fisher et al. | 717/177 |
| 2003/0023579 A1* | 1/2003 | Day et al. | 707/1 |
| 2005/0216495 A1* | 9/2005 | Wen et al. | 707/101 |
| 2005/0240943 A1* | 10/2005 | Smith et al. | 719/328 |
| 2006/0143201 A1* | 6/2006 | Day et al. | 707/100 |
| 2007/0299828 A1* | 12/2007 | Lewis et al. | 707/3 |
| 2008/0040361 A1* | 2/2008 | Day et al. | 707/100 |
| 2011/0125768 A1* | 5/2011 | Shibao | 707/756 |
| 2012/0233187 A1* | 9/2012 | Chang | 707/755 |

OTHER PUBLICATIONS

McLennen, et al; Getting More Information into File Names; Software Systems Research laboratory the University of Michigan; Jan. 18, 1996.

Bowers, et al; Hail: A High Availability and Integrity Layer for Cloud Storage; RSA Laboratories.

Bjoern Jacke; Man page for "convmv" command; http://www.j3e.de/linux/convmv/man/; Aug. 3, 2008.

* cited by examiner

METHOD TO AUTOMATICALLY DISPLAY FILENAMES ENCODED IN MULTIPLE CODE SETS

BACKGROUND

1. Technical Field

The present invention relates generally to a computer implemented method, data processing system, and computer program product for converting and rendering text. More specifically, the present invention relates to detecting and converting a text from at least one encoding to another, and then rendering the text to characters readable by users.

2. Description of the Related Art

A character is a written form of a language. Many characters correspond to specific sounds in a language. A character can be, for example, a letter, punctuation, a number, or a mathematical symbol. A code set or coded character set is defined as a set of rules that defines a character set and the one-to-one relationship between each character and its bit pattern. A code set defines the bit patterns that a data processing system uses to identify characters. Examples of code sets are ISO-8859-1, UTF-8, UTF-16, UTF-32, GB 18030, and big5.

Users can use a conventional computer to read names and contents of files and directories. However, because the names and contents can be created and encoded by different users under different code set environments, it is possible that the names and contents are encoded in two or more code sets. Conventional file system navigational tools and file content viewers and editors are geared to show a single code set or mapping from the native bits of the file to pixel representations of each character. As a consequence, conventional file system navigational tools will render correctly on a screen only those names of files and directories that are encoded in the single code set, and file content viewers and editors will render correctly on a screen only those contents that are encoded in the single code set.

SUMMARY

According to one illustrative embodiment, a method is disclosed for viewing content encoded in at least one code set and stored in a file system. A computer identifies a unified code set covering all characters used in the file system. The computer, responsive to a user input to view the content, determines whether content is wholly encoded in the unified code set. The computer, responsive to determining that the content is not wholly encoded in the unified code set, converts encoding of the content to the unified code set to form converted content. The computer displays the converted content.

According to another illustrative embodiment, a computer program product has one or more computer-readable, tangible storage devices and computer-readable program instructions which are stored on the one or more storage devices. The computer program product is for viewing content encoded in at least one code set and stored in a file system. When executed, the program instructions configure a data processing system to identify a unified code set covering all characters used in the file system. When executed, the program instructions configure a data processing system to determine whether the content is wholly encoded in the unified code set, responsive to a user input to view the content. When executed, the program instructions configure a data processing system to convert encoding of the content to the unified code set to form converted content, responsive to determining that the content is not wholly encoded in the unified code set. When executed, the program instructions configure a data processing system to display the converted content.

According to another illustrative embodiment, a computer system is disclosed. The computer system comprises one or more processors, one or more computer-readable memories and one or more computer-readable, tangible storage devices. The computer system is for viewing content encoded in at least one code set and stored in a file system. Program instructions, which are stored on the one or more storage devices for execution by the one or more processors via the one or more memories, can be executed by the one or more processors to identify a unified code set covering all characters used in the file system. The program instructions, which are stored on the one or more storage devices for execution by the one or more processors via the one or more memories, can be executed by the one or more processors to determine whether the content is wholly encoded in the unified code set, responsive to a user input to view the content. The program instructions, which are stored on the one or more storage devices for execution by the one or more processors via the one or more memories, can be executed by the one or more processors to convert encoding of the content to the unified code set to form converted content, responsive to determining that the content is not wholly encoded in the unified code set. The program instructions, which are stored on the one or more storage devices for execution by the one or more processors via the one or more memories, can be executed by the one or more processors to display the converted content.

According to another illustrative embodiment, a method is disclosed for use with a file system having files containing multiple code sets to allow viewing of file content encoded in the multiple code sets. A user interface program identifies a unified code set covering all characters used in the file system. The user interface program detects at least one code set used with each file name of a folder having a subset of the files, wherein each file is in at least one directory of the file system. The user interface program saves, for each file of the folder, the at least one code set in a list to form a corresponding at least one code set for each file. The user interface program receives a user input to open the folder.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
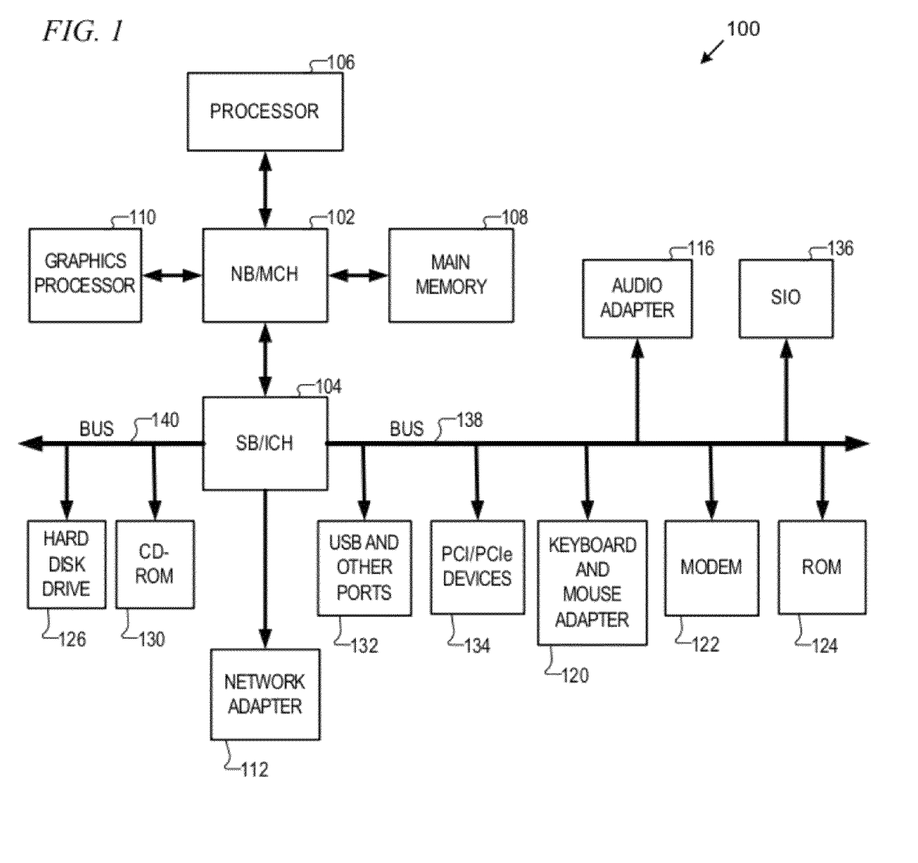
FIG. 1 is a block diagram of a data processing system in accordance with an illustrative embodiment of the invention.

With reference now to the figures and in particular with reference to FIG. 1, a block diagram of a data processing system is shown in accordance with an illustrative embodiment of the invention and in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 or bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Unix® or Microsoft® Windows®. Unix is a registered trademark of The Open Group in the United States and other countries. Microsoft and Windows are trademarks of Microsoft Corporation in the United States, other countries, or both. An object oriented programming system, such as the Java™ programming system, may run in conjunction with the operating system and provide calls to the operating system from Java™ programs or applications executing on data processing system 100. Java™ is a trademark or registered trademark of Oracle Corporation and/or its affiliates in the United States, other countries, or both.

Figure 3:
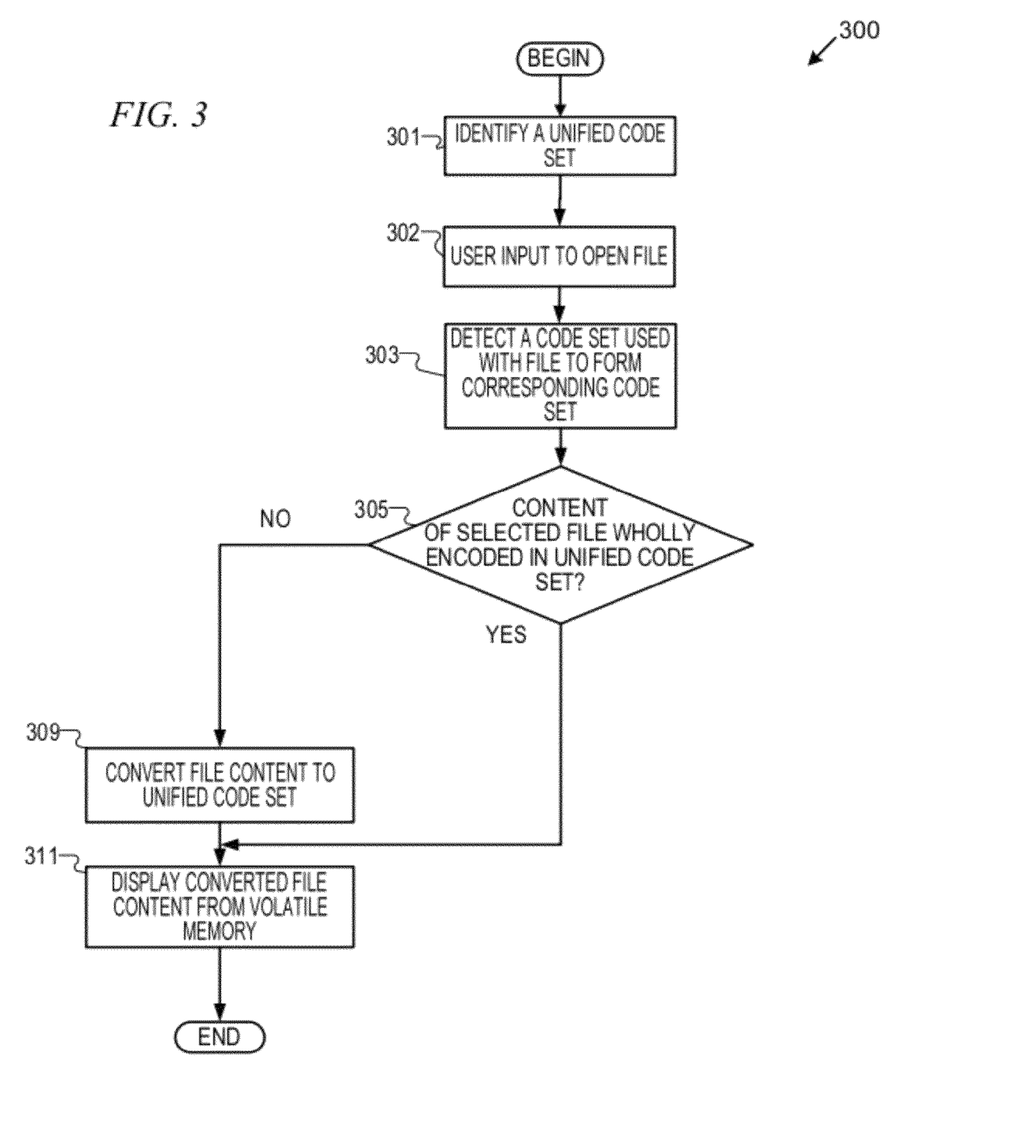
FIG. 3 is a flowchart of a method for displaying converted file content in accordance with an illustrative embodiment of the invention.
Figure 4:
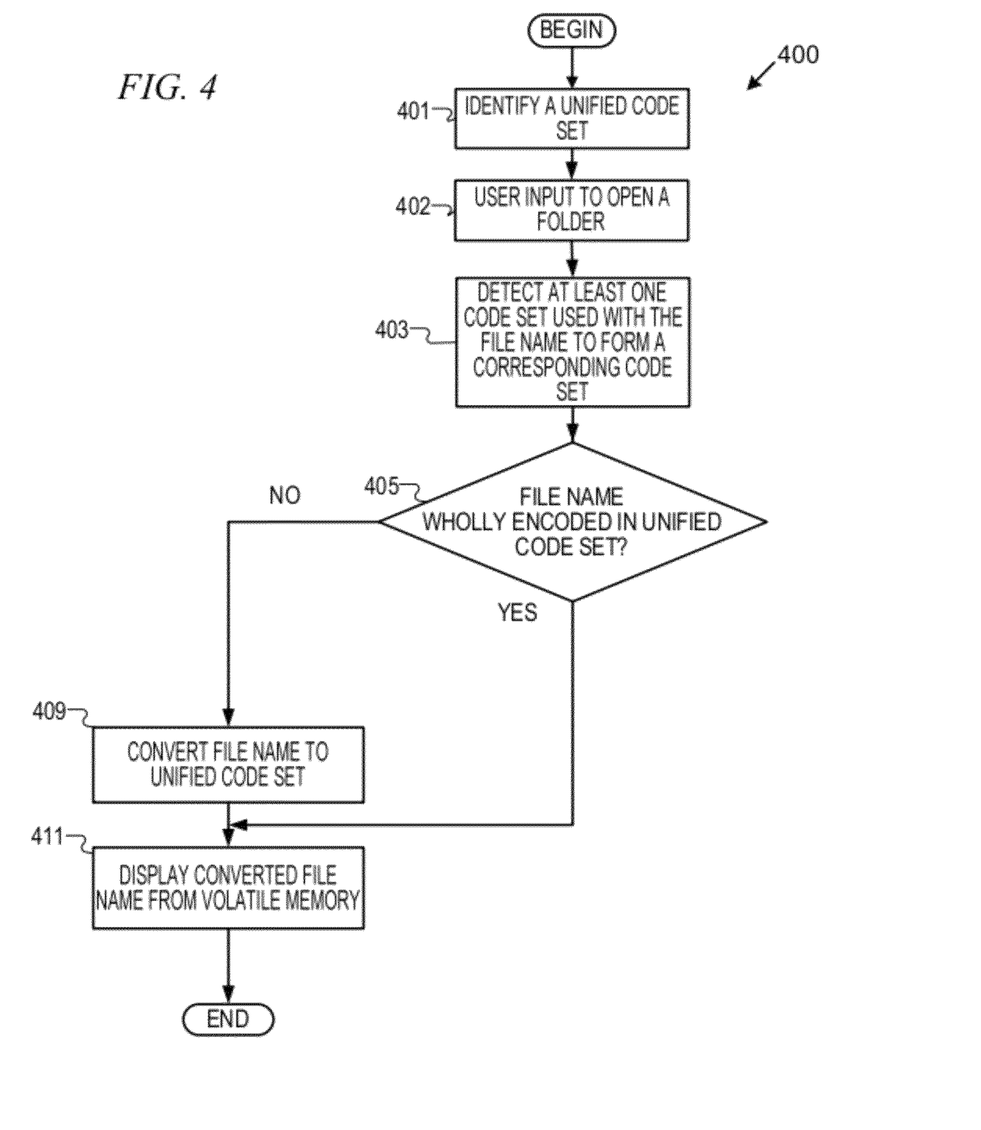
FIG. 4 is a flowchart of a method for displaying converted file names in accordance with an illustrative embodiment of the invention.

Instructions for the operating system, the object-oriented programming system, and applications or programs, such as the user interface program described herein with reference to FIG. 3 and the user interface program described herein with reference to FIG. 4, are located on at least one of one or more computer readable tangible storage devices, such, for example, as hard disk drive 126 or CD-ROM 130, for execution by at least one of one or more processors, such as, for example, processor 106, via at least one of one or more computer readable memories, such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention is presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable device(s) having computer readable program code embodied thereon.

Any combination of one or more computer readable device(s) may be utilized. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can contain, or store a program for use by or in connection with an instruction execution system, apparatus, or device. The term "computer-readable storage device" does not encompass a signal propagation media such as a copper transmission cable, optical transmission fiber or wireless transmission media.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
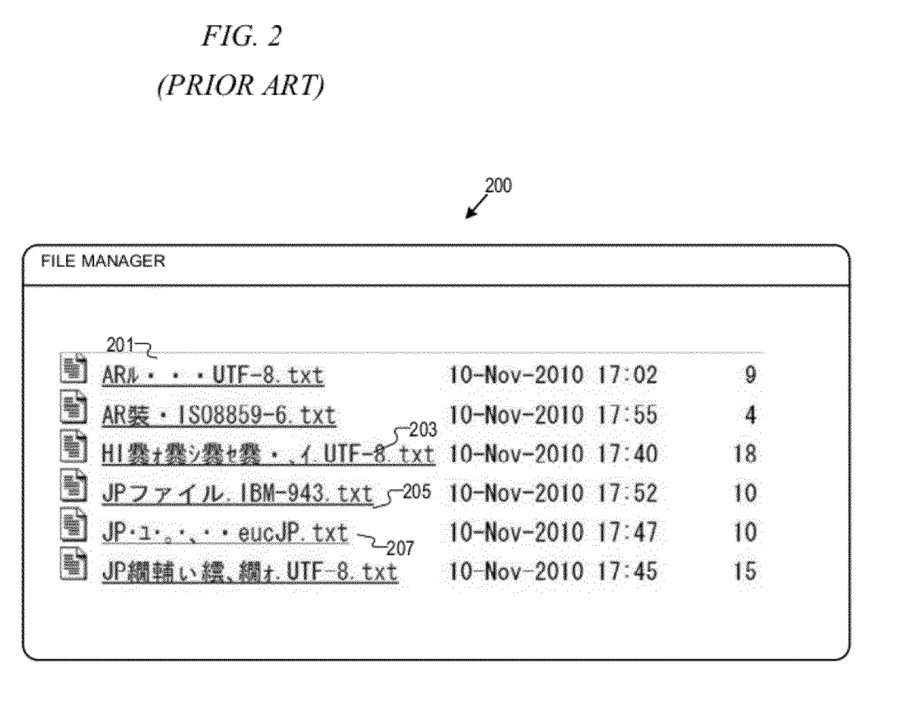
FIG. 2 is a representation of a text displayed from different code sets according to the prior art.

FIG. 2 is a representation of a text displayed from different code sets according to the prior art. A user obtains a display of file names stored in a file system within a data directory data structure. Six files are present in directory 200 and displayed using the IBM-943 code set. Because of the heterogeneous encoding of characters when each file name is stored, many characters cannot map to meaningful characters when, for example, all characters are rendered using a single code set such as IBM-943. Each file name, respectively, contains Arabic characters encoded as UTF-8 characters, Arabic characters encoded as ISO8859 characters, Hindi characters encoded as UTF-8 characters, and Japanese characters. Thus, each filename includes characters encoded according to a different code set. The prior art system, however, renders all file names assuming that they are each encoded in the IBM-943 code set that is used by the file system management tool. However, none of these file names can be entirely represented using mappings of IBM-943. Instead, the bytes that store and encode the file names map to other characters that appear as a collection of random characters to any reader regardless of the language. To illustrate, the six file names as rendered in directory 200 include those that are displayed as incorrectly rendered string 201, incorrectly rendered string 203, incorrectly rendered string 205, and incorrectly rendered string 207. Accordingly, a user's discerning the nature of the contents of the files, or the languages in which the files are written, by reading the file names will be difficult or impossible.

The illustrative embodiments permit a conversion of file names or file contents from their native byte encoding in a storage system, to a unified code set in memory. From volatile memory, the unified code set is used to render the file names or file contents. Rendering of a file name can be within a rendering of a directory structure within a user interface, and rendering of a file can be within a text editor.

A file system is a data structure that flexibly permits sequential data to be stored to non-volatile storage devices, such as storage devices described above with respect to FIG. 1. A file system typically allocates device space, for example, tracks in a ferromagnetic disk, in blocks that are multiples at least of 512 bytes, allowing for the possibility of fragmenting files into discontinuous groups of the minimum block size. A file system records actual file data, in addition to metadata about the file. File data can include bytes that are encoded to match human readable languages through the use of a code set. Similarly, the metadata, such as file names, that are intended to also be human-readable, are also encoded to bytes according to the code sets of text written therein.

A human-readable file can be a flat text file, or a file that includes text as well as formatting instructions, wherein the formatting instructions are not necessarily human readable. Formatting instructions include instructions to boldface a character and set margins in a what-you-see-is-what-you-get (WYSIWYG) page representation of a file as it would appear if printed. Moreover, a human-readable file is with respect to all humans. Thus, a file encoded to a code set that is Japanese for some text, and English for other text, remains a human-readable file, although some humans cannot read English and/or Japanese. Similarly, a file remains human-readable even if it contains trademarks or fanciful words such as acronyms and other mnemonics, since the file can be read by at least some humans. However, a file or subset of a file is not human readable if the normal and customary interpretation of the file content requires a human to resort to looking up symbols in a table keyed by bit sequences.

A file is machine or human readable content together with metadata such as the date of modification. A file is machine readable to the extent that it is stored in the storage device or within volatile memory in a manner consistent with the file system. In other words, the file data structure has not degraded due to defects in the storage device or apparatus used to read from the storage device. In other words, a file can be stored indefinitely within the storage device, or alternatively, stored in memory that is volatile, such as random access memory.

Volatile memory is memory that requires an impulse of energy at least several times a minute so as not to risk an inability to read content from the memory. Thus, volatile memory can, for example, rely on recurring charges to sustain storage of information. In contrast, non-volatile memory or non-volatile storage does not rely on recurring impulses of energy. Non-volatile memory can be writable or alternatively non-rewritable. Non-volatile memory, though subject to mechanical and magnetic breakdowns, can store information for days, weeks or months in normal data processing systems, all without any sustaining impulses of energy.

A unified code set is a code set that has a mapping for every character in the languages of the files stored in the file system. The mapping is from a written character to a sequence of bits that is on a one-to-one basis. A unified code set can be Unicode. Unicode, or the Unicode code set, has mappings to characters in most language scripts. Nevertheless, a data processing system that uses fewer languages may be used where there is a fewer number of file encodings on a file system, such as may occur when the data processing system uses a file system limited to hosting files only of the languages of Northern Europe. In other words, the unified code set is a code set that converts bytes to displayed or otherwise rendered characters. By using the unified code set in such a conversion, the unified code set makes such characters readable to a reader that uses one of the languages encoded by the unified code set.

FIG. 3 is a flowchart of a method for displaying converted file content in accordance with an illustrative embodiment of the invention. The steps of flowchart 300 are executed by a user interface program executed on a data processing system, for example, data processing system 100 of FIG. 1.

Initially, the user interface program identifies a unified code set applicable to all characters stored as bytes in the file system (step 301). At step 301, the user interface program may record an identifier of the unified code set in a global system variable. Next, the user interface program may receive user input to open, for example, in an editor program, a file (step 302). A user input to open the file is user input made to the data processing system through a manual peripheral. A manual peripheral is, for example, a keyboard, pointing device or voice input. The file corresponding to the user input can correspond to a file name identified by the user input.

Next, the user interface program detects at least one code set used to encode the file to form a corresponding code set (step 303). The user interface program can detect the at least one code set, for example, using steps similar to the Firefox™ browser's operation "auto codeset_detect". Firefox™ is a trademark of Mozilla Corporation. The corresponding code set may be organized as a list of the at least one code set used to encode the human-readable content of the file. In one exemplary embodiment, at step 303, the user interface program detects a first code set used to encode a first subset of the file and a second code set used to encode a second subset of the file.

The file is in a directory of a file system. The unified code set has a mapping for languages of the file. However, the file may not be wholly encoded using the unified code set. Thus, a determination is made whether content of the selected file is wholly encoded in the unified code set (step 305). If the content of the selected file is wholly encoded in the unified code set, processing continues at step 311 where the file is displayed from volatile memory.

However, if the result at step 305 is negative, the user interface program converts the file content to the unified code (step 309). The user interface program can utilize the corresponding code set generated at step 303 to identify at least one code set in which the file content is encoded prior to converting the file content to the unified code set. The user interface program may reference the global system variable to identify the unified code set to which file content is to be converted. This conversion step may place a converted file content into volatile memory. Where the unified code set is set to Unicode, the file content is converted to a Unicode version of the file content. If only a portion of the file content was converted to the unified code set at step 309, a determination that more unconverted code sets remain may trigger further conversions, for example, by repeating some or all of the steps of flowchart 300.

Finally, the user interface program displays the converted file content from volatile memory (step 311). Displaying can include iteratively looking up an image of the character corresponding to each bit sequence of the file content, while using formatting and other directives to position, size and otherwise tailor the displayed text images according to the available screen, colors, etc.

FIG. 4 is a flowchart of a method for displaying converted file names in accordance with an illustrative embodiment of the invention. The steps of flowchart 400 are executed by a user interface program executed on a data processing system, for example, data processing system 100 of FIG. 1.

Initially, the user interface program identifies a unified code set applicable to all characters stored as bytes in the file system (step 401). At step 401, the user interface program may record an identifier of the unified code set in a global system variable.

Next, the user interface program may receive user input to open, for example, in an editor program, a folder (step 402). Receiving the user input to open the folder can be a trigger for the user interface program to display a list of file names, e.g., in a file system user interface. An example of a file system user interface may be a windowed rendering of a directory of files, such as shown in folder 500 of FIG. 5. A user input to open the folder is user input made to the data processing system through a manual peripheral. The folder corresponding to the user input can correspond to a folder name identified by the user input. Next, the user interface program detects at least one code set used with a file name in the list of file names to form a corresponding code set (step 403). In one exemplary embodiment, at step 403, the user interface program detects a first code set used to encode a first subset of the file name and a second code set used to encode a second subset of the file name.

The unified code set has a mapping for languages of the file name. However, the file name may not be wholly encoded using the unified code set. Thus, a determination is made whether file name is wholly encoded in the unified code set (step 405). If the file name is wholly encoded in the unified code set, processing continues at step 411 where the file name is displayed from volatile memory.

However, if the result at step 405 is negative, the user interface program converts the file name to the unified code set (step 409). The user interface program can utilize the corresponding code set generated at step 403 to identify at least one code set in which the file name is encoded prior to converting the file name to the unified code set. The user interface program may reference the global system variable to identify the unified code set to which file name is to be converted. This conversion step may place a converted file name into volatile memory. Where the unified code set is set to Unicode, the file name is converted to a Unicode version of the file name. If only a portion of the file name was converted to the unified code set at step 409, a determination that more unconverted code sets remain may trigger further conversions, for example, by repeating some or all of the steps of flowchart 400.

Finally, the user interface program displays the converted file name from volatile memory (step 411). Displaying can include iteratively looking up an image of the character corresponding to each bit sequence of the file name, while using formatting and other directives to position, size and otherwise tailor the displayed text images according to the available screen, colors, etc.

It is appreciated that operation of a data processing system by a user may sequence the performance of flowchart 300 and flowchart 400 in any order. For example, a user may initially prefer to navigate among file names, by providing input to step 402, inputting to open a file. The data processing system may respond by displaying a file name of interest to the user, for example, by executing step 411. Accordingly, a follow-up step by the user can be to open the file using steps of flowchart 300, and specifically, step 302.

Figure 5:
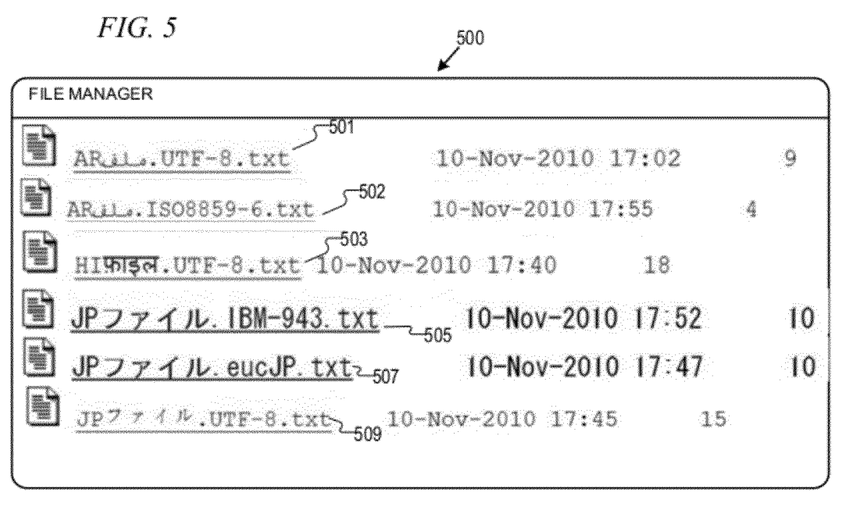
FIG. 5 is a directory rendered using file name conversion in accordance with an illustrative embodiment of the invention.

FIG. 5 is a directory rendered using file name conversion in accordance with an illustrative embodiment of the invention. File names that are stored using, for example, the code set of Arabic may be converted in volatile memory to display text in the corresponding languages of combined Arabic/UTF-8 encoded file name 501 and combined Arabic/ISO8859-6 encoded file name 502. Note that Arabic can be encoded in at least the UTF-8 and ISO8859-6 code sets (at least that is the native code set of parts of 501 and 502, respectively). In response to all subsets of file name being converted to the unified code set, the file name can be displayed to, for example, folder 500. A folder is a graphical user interface that displays at least a subset of files within a hierarchical directory. Accordingly, a subset of files is associated with a folder. Within folder 500, the file name for the combined Arabic/IISO-8859-6 encoded file name 502 is rendered according to the mapping of the unified code set. Similarly, Hindi/UTF-8 file name 503, Japanese/IBM-943 file name 505, Japanese/eucJP file name 507, and Japanese/UTF8 file name 509 appear in folder 500.

Alternatively, a display of converted file content may be to a window that shows a file for reading or editing. As such, the window may display the one or more languages, using the unified encoding, to fill the window, while portions of the file may remain in memory without displaying due to limitations of the window size. Accordingly, displaying may be dynamic, and responsive to further user inputs.

The described method to display file names and other file content permits the files to be stored in non-volatile storage in their native code set encoding. Accordingly, use of the illustrative embodiments requires no changes to the file system. By the use of the user interface program, a user may be able to understand those characters used to name a file, as well as file contents beyond the file name.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or computer readable tangible storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for rendering and displaying a name of a first file in a directory of files, the method comprising:

a computer receiving a request to display, in a first natural language, a list of files in the directory, and in response, the computer determining that the name of the first file contains (a) a first plurality of characters from a first alphabet of the first natural language and (b) a second plurality of characters in a second, different alphabet of a second natural language, and in response, the computer converting the second plurality of characters to corresponding characters of a third alphabet which are mapped to respective, different characters in the first alphabet language and respective, different characters in the second alphabet, the characters of the third alphabet being sufficiently similar in appearance to the corresponding characters in the first alphabet and the corresponding characters in the second alphabet such that a first person who is able to read the first natural language is able to understand the characters of the third alphabet and a second person who is able to read the second natural language is able to understand the characters of the third alphabet, the characters of the third alphabet being different than the corresponding characters of the first and second alphabets;

and the computer displaying in the list the one file name with the first plurality of characters in the first natural language and the second plurality of characters converted to the third alphabet.

2. The method of claim 1, wherein at least one name of the file in the list of files in the directory is partially stored using the first alphabet and partially stored using the second alphabet within a file system and converting further comprises obtaining the at least one name from the file system and converting does not include converting the first plurality of characters from a first alphabet of the first natural language.

3. The method of claim 2, wherein obtaining the at least one name from a non-volatile storage.

4. The method of claim 1, wherein the third alphabet is a Unicode code set having all characters of the first natural language and all characters in the second natural language mapped to corresponding bit patterns.

5. The method of claim 1, further comprising:
determining that the at least one name is not wholly encoded using the first alphabet of the first natural language, and in response, performing the converting step.

6. The method of claim 5, wherein each character of the at least one name, as stored to a file system, is not encoded in any alphabet which maps characters of plural alphabets, of natural languages to bit patterns, but the second plurality of characters converted to the third alphabet are displayed relying on storage only to volatile memory, without subsequently storing the second plurality of characters converted to the third alphabet to the file system.

7. The method of claim 1, wherein the first alphabet of the first natural language is a set of mappings for every character in the first natural language but lacks mappings to any character of the second natural language, such that each character of the first natural language is one-to-one mapped to a corresponding bit pattern such that a display of the character of the corresponding bit pattern is recognized by a reader of the first natural language.

8. The method of claim 1 wherein the third alphabet is not characters of a natural language.

9. A computer program product for rendering and displaying a name of a first file in a directory of files, the computer program product comprising: a computer usable storage device having computer readable program code stored thereon, the computer readable program code comprising:
computer usable program code configured to receive a request to display, in a first natural language, a list of files in the directory, and in response, determine that the name of the first file contains (a) a first plurality of characters from a first alphabet of the first natural language and (b) a second plurality of characters in a second, different alphabet of a second natural language, and in response,
computer usable program code configured to convert the second plurality of characters to corresponding characters of a third alphabet which are mapped to respective, different characters in the first alphabet language and respective, different characters in the second alphabet, the characters of the third alphabet being sufficiently similar in appearance to the corresponding characters in the first alphabet and the corresponding characters in the second alphabet such that a first person who is able to read the first natural language is able to understand the characters of the third alphabet and a second person who is able to read the second natural language is able to understand the characters of the third alphabet, the characters of the third alphabet being different than the corresponding characters of the first and second alphabets;

and computer usable program code configured to display in the list the one file name with the first plurality of characters in the first natural language and the second plurality of characters converted to the third alphabet.

10. The computer program product of claim 9, wherein at least one name of the file in the list of files in the directory is partially stored using the first alphabet and partially stored using the second alphabet within a file system and computer usable program code configured to convert further comprises computer usable program code configured to obtain the at least one name from the file system and converting does not include converting the first plurality of characters from a first alphabet of the first natural language.

11. The computer program product of claim 10, wherein computer usable program code configured to obtain the at least one name from a non-volatile storage.

12. The computer program product of claim 9, wherein the third alphabet is a Unicode code set having all characters of the first natural language and all characters in the second natural language mapped to corresponding bit patterns.

13. The computer program product of claim 9, further comprising:
computer usable program code configured to determine that the at least one name is not wholly encoded using the first alphabet of the first natural language, and in response, to convert.

14. The computer program product of claim 13, wherein each character of the at least one name, as stored to a file system, is not encoded in any alphabet which maps characters of plural alphabets, of natural languages to bit patterns, but the second plurality of characters converted to the third alphabet are displayed relying on storage only to volatile memory, without subsequently storing the second plurality of characters converted to the third alphabet to the file system.

15. The computer program product of claim 9, wherein the first alphabet of the first natural language is a set of mappings for every character in the first natural language but lacks mappings to any character of the second natural language, such that each character of the first natural language is one-to-one mapped to a corresponding bit pattern such that a display of the character of the corresponding bit pattern is recognized by a reader of the first natural language.

16. A data processing system comprising:
a bus;
a computer readable tangible storage device connected to the bus, wherein computer usable code is located in the computer readable tangible storage device;
a communication unit connected to the bus; and
a processing unit connected to the bus, wherein the processing unit executes the computer usable code for rendering and displaying a name of a first file in a directory of files, wherein the processing unit executes the computer usable program code to receive a request to display, in a first natural language, a list of files in the directory, and in response, determine that the name of the first file contains (a) a first plurality of characters from a first alphabet of the first natural language and (b) a second plurality of characters in a second, different alphabet of a second natural language, and in response, convert the second plurality of characters to corresponding characters of a third alphabet which are mapped to respective, different characters in the first alphabet language and respective, different characters in the second alphabet, the characters of the third alphabet being sufficiently similar in appearance to the corresponding characters in the first alphabet and the corresponding characters in the second alphabet such that a first person who is able to read the first natural language is able to understand the characters of the third alphabet and a second person who is able to read the second natural language is able to understand the characters of the third alphabet, the characters of the third alphabet being different than the corresponding characters of the first and second alphabets; and display in the list the one file name with the first plurality of characters in the first natural language and the second plurality of characters converted to the third alphabet.

17. The data processing system of claim 16, wherein at least one name of the file in the list of files in the directory is partially stored using the first alphabet and partially stored using the second alphabet within a file system and wherein in executing computer usable code to convert, the processing unit further executes computer usable program code configured to obtain the at least one name from the file system and converting does not include converting the first plurality of characters from a first alphabet of the first natural language.

18. The data processing system of claim 17, wherein in executing computer usable code to obtain, the processing unit obtains the at least one name from a non-volatile storage.

19. The data processing system of claim 16, wherein the third alphabet is a Unicode code set having all characters of the first natural language and all characters in the second natural language mapped to corresponding bit patterns.

20. The data processing system of claim 16, wherein the processing unit further executes computer usable code to determine that the at least one name is not wholly encoded using the first alphabet of the first natural language, and in response, to convert.

21. The data processing system of claim 20, wherein each character of the at least one name, as stored to a file system, is not encoded in any alphabet which maps characters of plural alphabets, of natural languages to bit patterns, but the second plurality of characters converted to the third alphabet are displayed relying on storage only to volatile memory, without subsequently storing the second plurality of characters converted to the third alphabet to the file system.

22. The data processing system of claim 16, wherein the first alphabet of the first natural language is a set of mappings for every character in the first natural language but lacks mappings to any character of the second natural language, such that each character of the first natural language is one-to-one mapped to a corresponding bit pattern such that a display of the character of the corresponding bit pattern is recognized by a reader of the first natural language.

* * * * *